(12) United States Patent
Koide et al.

(10) Patent No.: US 10,559,423 B2
(45) Date of Patent: Feb. 11, 2020

(54) MULTILAYER CERAMIC ELECTRONIC DEVICE

(71) Applicant: TDK CORPORATION, Tokyo (JP)

(72) Inventors: Nobuyuki Koide, Tokyo (JP);
Toshihiko Kaneko, Tokyo (JP);
Yasushi Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 3 days.

(21) Appl. No.: 15/854,321

(22) Filed: Dec. 26, 2017

(65) Prior Publication Data

US 2018/0182549 A1 Jun. 28, 2018

(30) Foreign Application Priority Data

Dec. 28, 2016 (JP) ................................. 2016-255977

(51) Int. Cl.
*B32B 18/00* (2006.01)
*C04B 35/468* (2006.01)
(Continued)

(52) U.S. Cl.
CPC ........... *H01G 4/1227* (2013.01); *B32B 18/00* (2013.01); *C04B 35/4682* (2013.01); *C04B 35/6264* (2013.01); *C04B 35/638* (2013.01); *C04B 35/64* (2013.01); *H01G 4/30* (2013.01); *B32B 38/145* (2013.01); *B32B 2315/02* (2013.01); *C04B 2235/3236* (2013.01); *C04B 2235/5445* (2013.01); *C04B 2235/6025* (2013.01); *C04B 2235/6562* (2013.01); *C04B 2235/6567* (2013.01); *C04B 2235/6588* (2013.01); *C04B 2235/663* (2013.01); *C04B 2235/79* (2013.01);
(Continued)

(58) Field of Classification Search
CPC ... B32B 18/00; B32B 38/145; B32B 2315/02; C04B 35/4682; C04B 35/6264; C04B 35/638; C04B 35/468; C04B 35/626; C04B 35/64; C04B 2235/3236; C04B 2235/5445; C04B 2235/6025; C04B 2235/6562; C04B 2235/6567; C04B 2235/6588; C04B 2235/663; C04B 2235/79; C04B 2235/9638; C04B 2237/346; C04B 2237/704; H01G 4/1227; H01G 4/30; H01G 4/12; H01G 4/008; H01G 4/1218
USPC .................................. 361/321.2, 305, 301.4
See application file for complete search history.

(56) References Cited

U.S. PATENT DOCUMENTS

| | | | | |
|---|---|---|---|---|
| 2004/0189437 A1* | 9/2004 | Mihara | ................... | H01C 7/021 338/100 |
| 2006/0098385 A1* | 5/2006 | Sakashita | ............. | H01G 4/1218 361/272 |

(Continued)

FOREIGN PATENT DOCUMENTS

| | | | | | |
|---|---|---|---|---|---|
| JP | 2003-077761 A | | 3/2003 | | |
| JP | 2005136046 A | * | 5/2005 | ............... | H01G 4/12 |
| JP | WO 2015098728 A1 | * | 7/2015 | ............. | H01G 4/005 |

*Primary Examiner* — Timothy J Thompson
*Assistant Examiner* — Guillermo J Egoavil
(74) *Attorney, Agent, or Firm* — Oliff PLC (57) ABSTRACT

A multilayer ceramic electronic device includes a laminated body having alternately laminated internal electrode layers and dielectric layers. The dielectric layer has a thickness of 0.5 μm or less. The internal electrode layers contain ceramic particles. A content ratio of the ceramic particles contained in the internal electrode layer is 2 to 15% by representation of cross sectional area.

7 Claims, 3 Drawing Sheets

(51) Int. Cl.
  *C04B 35/626*  (2006.01)
  *C04B 35/64*   (2006.01)
  *H01G 4/30*    (2006.01)
  *H01G 4/12*    (2006.01)
  *C04B 35/638*  (2006.01)
  *B32B 38/00*   (2006.01)

(52) U.S. Cl.
  CPC ........... *C04B 2235/9638* (2013.01); *C04B 2237/346* (2013.01); *C04B 2237/704* (2013.01)

(56) References Cited

U.S. PATENT DOCUMENTS

| | | | |
|---|---|---|---|
| 2006/0198078 A1* | 9/2006 | Miyauchi | H01G 4/008 361/305 |
| 2011/0247186 A1* | 10/2011 | Yu | H01G 4/012 29/25.42 |
| 2017/0365411 A1* | 12/2017 | Taniguchi | H01G 4/1218 |
| 2018/0090273 A1* | 3/2018 | Hwang | H01G 4/012 |
| 2019/0237254 A1* | 8/2019 | Sakurai | C04B 35/62675 |

* cited by examiner

MULTILAYER CERAMIC ELECTRONIC DEVICE

BACKGROUND OF THE INVENTION

1. Field of the Invention

The present invention relates to a multilayer ceramic electronic device capable of improving reliability even if dielectric layers are thinned.

2. Description of the Related Art

In accordance with downsizing and thinning of electronic equipment, multilayer ceramic electronic devices contained therein are required to be downsized and thinned, and various multilayer ceramic electronic devices having thinned dielectric layers and internal electrode layers are proposed.

In such multilayer ceramic electronic devices, there may be a case that the internal electrode layers are spheroidized by grain growth of metal particles due to thermal shrinkage difference between the dielectric layers and the internal electrode layers following to sintering, and that the internal electrode layers have disconnected parts. Then, a multilayer ceramic electronic device of Patent Document 1 proposes a technique for reduction in the thermal shrinkage difference and prevention of the disconnected parts of the internal electrode layers by containing ceramic particles (co-existent material) having a predetermined size in the internal electrode layers.

If the dielectric layers are further thinned, however, a problem of decrease in reliability occurs, and the technique of Patent Document 1 alone cannot prevent decrease in reliability.

Patent Document 1: JP 2003-77761 A

SUMMARY OF THE INVENTION

The present invention has been achieved such circumstances. It is an object of the invention to provide a multilayer ceramic electronic device having a sufficient reliability even if it is thinned.

The present inventors have earnestly studied the above object, and found that a multilayer ceramic electronic device having a sufficient reliability can be provided by containing a comparatively large number of ceramic particles in internal electrode layers when a dielectric layer has a thickness of 0.5 µm or less. Then, the present invention has been achieved.

That is, the multilayer ceramic electronic device according to the present invention is a multilayer ceramic electronic device comprising a laminated body having alternately laminated internal electrode layers and dielectric layers, wherein the dielectric layer has a thickness of 0.5 µm or less,
the internal electrode layers contain ceramic particles, and
a content ratio of the ceramic particles contained in the internal electrode layer is 2 to 15% by representation of cross sectional area.

In the present invention, high temperature accelerated lifetime and reliability are improved by setting a content ratio of ceramic particles contained in the internal electrode layer within a predetermined range when the dielectric layer has a thickness of 0.5 µm or less. In the present invention, the dielectric layers can have a reduced thickness variation, and the internal electrode layers have an improved coverage factor. The dielectric layers preferably have a thickness variation of 100 nm or less, more preferably 90 nm or less, still more preferably 80 nm or less. The internal electrodes preferably have a coverage factor of 70% or more, more preferably 80% or more, still more preferably 85% or more.

Since a comparatively large number of the ceramic particles remain in the internal electrode layers, the amount of ceramic particles discharged from the internal electrode layers to the dielectric layers is small. Thus, the ceramic particles are prevented from reacting with a dielectric material constituting the dielectric layers. This prevents a composition deviation caused by change in crystal structure of the dielectric layers, and original properties of the multilayer ceramic electronic device can be obtained.

Preferably, the internal electrode layer has a thickness of 0.6 µm or less. When the dielectric layer has a thickness of 0.5 µm or less, the multilayer ceramic electronic device can have a further enhanced reliability with the internal electrode layers having a thickness of 0.6 µm or less.

Preferably, the internal electrode layers contain a main component of Ni.

The ceramic particles may contain at least one of $BaTiO_3$, $ZrO_2$, $R_2O_3$ (R is at least one of Y, Dy, Ho, and Er), and an oxide of an alkali earth metal (at least one of Mg, Ca, Ba, and Sr).

DESCRIPTION OF THE PREFERRED EMBODIMENTS

Hereinafter, the present invention is described based on an embodiment shown in figures.

Entire Structure of Multilayer Ceramic Capacitor

First, an entire structure of a multilayer ceramic capacitor is described as an embodiment of a multilayer ceramic electronic device according to the present invention.

Figure 1:
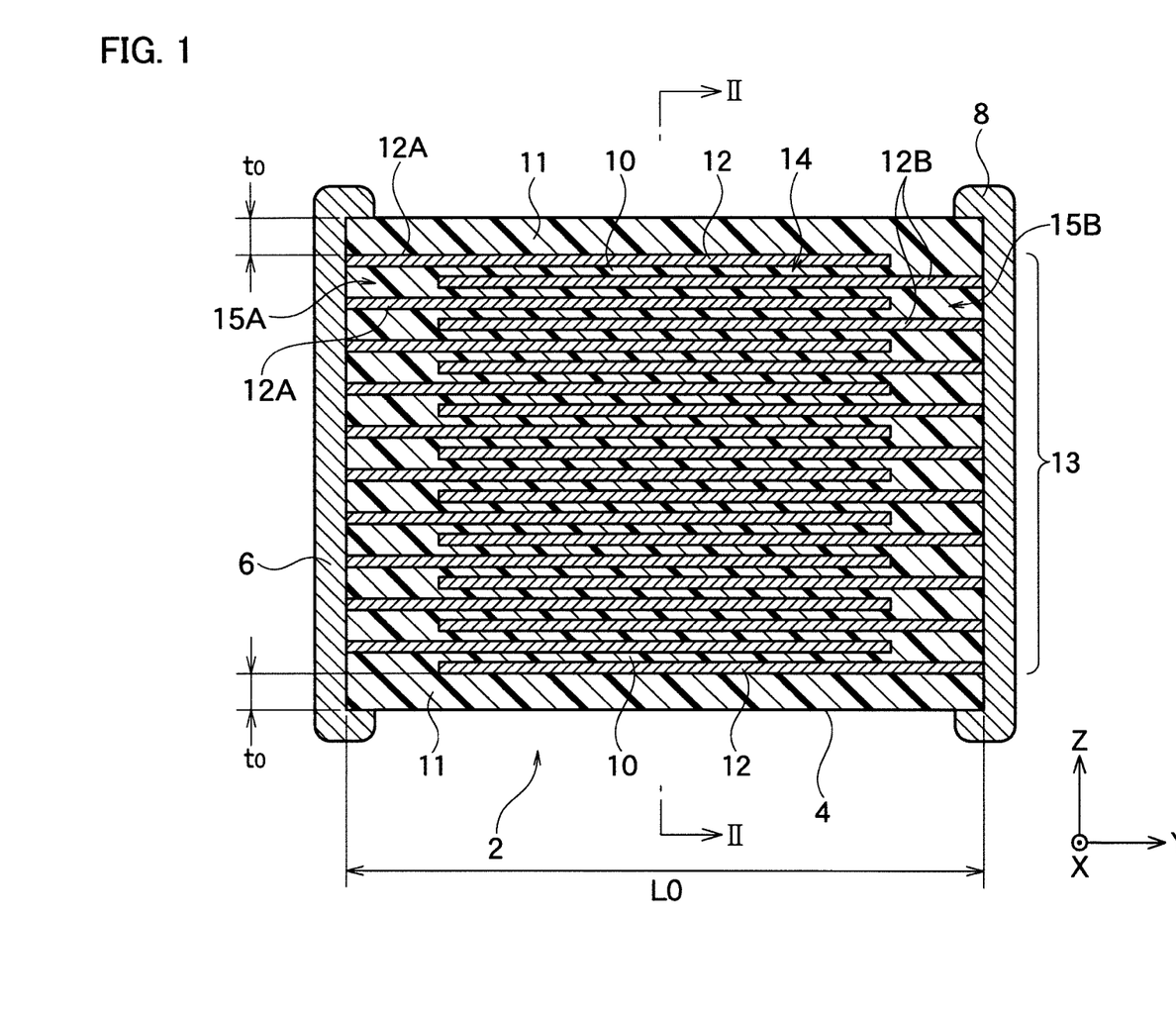
FIG. 1 is a schematic cross sectional view of a multilayer ceramic capacitor according to an embodiment of the present invention.

As shown in FIG. 1, a multilayer ceramic capacitor 2 according to the present embodiment has a capacitor element body 4, a first external electrode 6, and a second external electrode 8. The capacitor element body 4 contains internal dielectric layers 10 and internal electrode layers 12. The internal electrode layers 12 are laminated alternately among the internal dielectric layers 10. A part where the internal dielectric layers 10 and the internal electrode layers 12 are laminated alternately is an interior region 13.

An exterior region 11 is provided on both end surfaces of the capacitor element body 4 in the lamination direction (Z-axis). The exterior regions 11 are constituted by a dielectric layer that is thicker than the internal dielectric layer 10 constituting the interior region 13.

One side of the internal electrode layers 12 laminated alternately has a leading portion 12A electrically connected with the inside of the first external electrode 6 formed outside a first end portion of the capacitor element body 4 in the Y-axis direction. The other side of the internal electrode layers 12 laminated alternately has a leading portion 12B electrically connected with the inside of the second external electrode 8 formed outside a second end portion of the capacitor element body 4 in the Y-axis direction.

The interior region 13 has capacity regions 14 and leading regions 15A and 15B. The capacity regions 14 are regions where the internal electrode layers 12 are laminated by sandwiching the internal dielectric layers 10 along the lamination direction. The leading regions 15A are regions positioned among the leading portions 12A of the internal electrode layers 12 connected with the external electrode 6. The leading regions 15B are regions positioned among the leading portions 12B of the internal electrode layers 12 connected with the external electrode 8.

Figure 2:
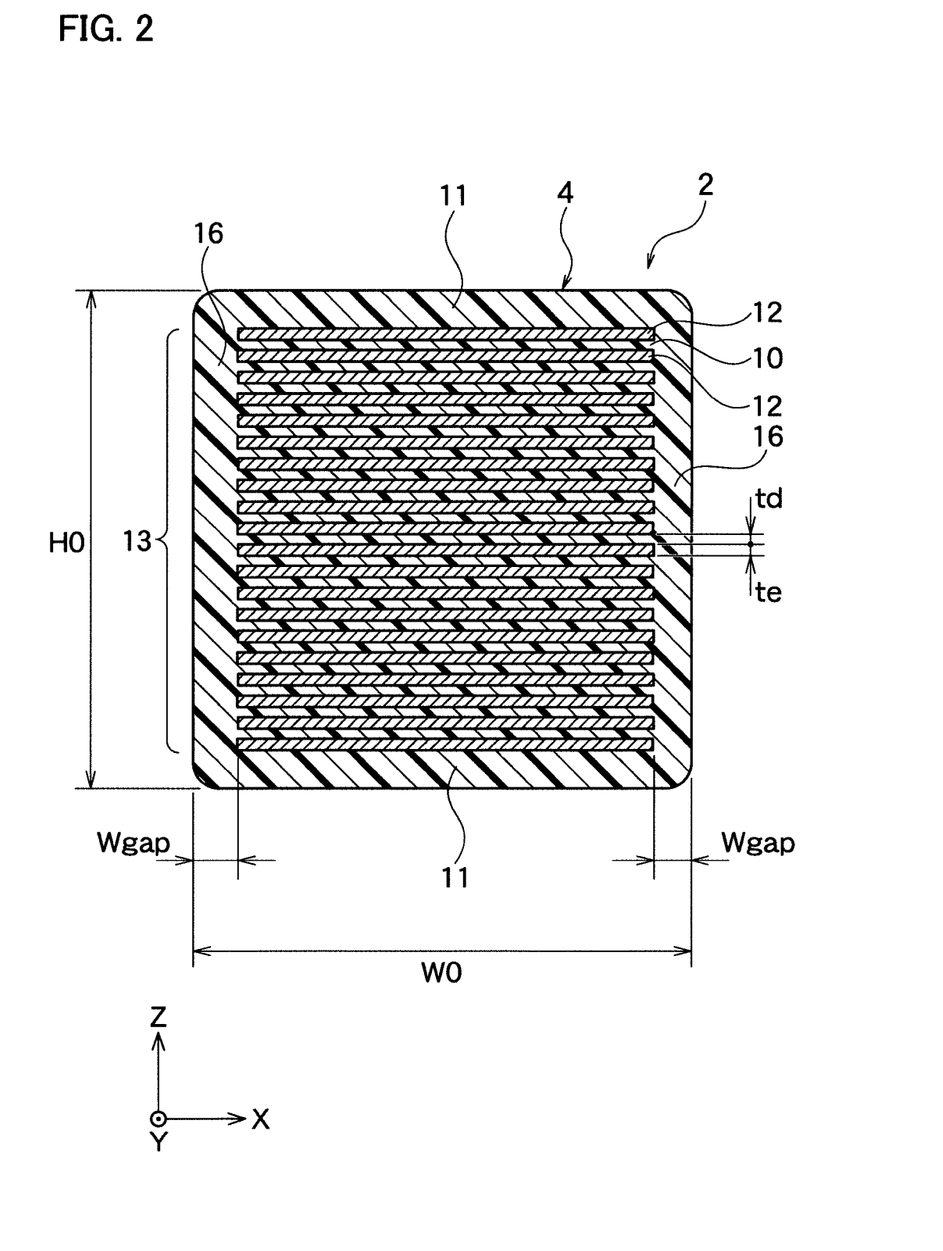
FIG. 2 is a cross sectional view taken along line II-II shown in FIG. 1.

As shown in FIG. 2, a side surface protection region 16 is formed on both ends of the capacitor element body 4 in the X-axis direction. The side surface protection regions 16 are constituted by a dielectric material that is identical to or different from a dielectric material constituting the dielectric layers of the internal dielectric layers 10 and/or the exterior regions 11. The leading regions 15A and 15B are constituted by a dielectric material that is identical to or different from a dielectric material constituting the internal dielectric layers 10.

The multilayer ceramic capacitor 2 has a shape and a size that are appropriately determined based on object, purpose, and the like. When the multilayer ceramic capacitor 2 has a rectangular parallelopiped shape, a length L0 (see FIG. 1) is normally 0.2 to 5.7 mm, but is preferably 0.2 to 2.0 mm in the present embodiment.

Incidentally, in FIG. 1, the length L0 of the multilayer ceramic capacitor 2 is illustrated as a length of the capacitor element body 4 in the Y-axis direction, but is approximately the same as a length of the multilayer ceramic capacitor 2 including the external electrodes 6 and 8 in the Y-axis direction. In the figures, the thicknesses of the external electrodes 6 and 8 are illustrated more thickly than their actual thicknesses for easy illustration of the figures, but are actually respectively about 10 to 50 μm and extremely thinner than the length L0. In the figures, the X-axis, the Y-axis, and the Z-axis are vertical to each other, the Z-axis corresponds with the lamination direction of the internal dielectric layers 10 and the internal electrode layers 12, and the Y-axis corresponds with a direction where the leading regions 15A and 15B (leading portions 12A and 12B) are formed.

As shown in FIG. 2, a height H0 of the multilayer ceramic capacitor 2 varies depending on the number of lamination of the internal dielectric layers 10 and the internal electrode layers 12 or so and is normally 0.2 to 3.2 mm, but is preferably 0.2 to 1.6 mm in the present embodiment. Incidentally, the height H0 of the multilayer ceramic capacitor 2 is illustrated as a thickness of the ceramic element body 4 in the Z-axis direction in FIG. 2, but is approximately the same as a thickness of the height H0 of the multilayer ceramic capacitor 2 also including the thicknesses of the external electrodes 6 and 8 shown in FIG. 1, as these thicknesses are small sufficiently.

The multilayer ceramic capacitor 2 normally has a width W0 of 0.2 to 5.0 mm, but has a width W0 of 0.59 mm or less, preferably 0.10 to 0.59 mm, more preferably 0.185 to 0.47 mm, in the present embodiment. When the dielectric layer has a thickness of 0.5 μm or less, the width W0 is preferably within the range. When the width W0 is within the range, cracks are hard to be generated on a capacitor element body after being manufactured.

In the present embodiment, a width Wgap of the respective side surface protection regions 16 in the X-axis direction shown in FIG. 2 corresponds with a gap size from the external surface of the ceramic element body 4 (end surface in the X-axis direction) to the end of the internal electrode layers 12 along the width direction of the ceramic element body 4 (X-axis direction). The width Wgap is 0.010 to 0.025 mm, preferably 0.015 to 0.025 mm. When the width Wgap is too small, cracks tend to be generated easily. When the width Wgap is too large, electrostatic capacitance tends to decrease largely.

Hereinafter, respective constituent members constituting the multilayer ceramic capacitor 2 are described in more detail.

Internal Dielectric Layer 10

Any dielectric material, such as a titanium oxide based material, a titanate based composite oxide, and a mixture of these, is used for the internal dielectric layers 10 constituting the multilayer ceramic capacitor 2 of the present embodiment.

Examples of titanium oxide based dielectrics include a $TiO_2$ containing about 0.001 to 30 wt % in total of one or more oxides of NiO, CuO, $Mn_3O_4$, $Al_2O_3$, MgO, $SiO_2$, etc. as necessary.

Examples of the titanate based composite oxide include barium titanate ($BaTiO_3$). An atomic ratio of Ba/Ti is preferably in a range of 0.95 to 1.20. The barium titanate may contain about 0.001 to 30 wt % in total of one or more oxides of MgO, CaO, $Mn_3O_4$, $Y_2O_3$, $V_2O_5$, ZnO, $ZrO_2$, $Nb_2O_5$, $Cr_2O_3$, $Fe_2O_3$, $P_2O_5$, SrO, $Na_2O$, $K_2O$, $Li_2O$, $SiO_2$, $WO_3$, etc.

In addition, the dielectric material may be an oxide compound of one element or a combination of two or more elements of Ba, Ca, Sr, Ti, Zr, La, Mg, Mn, V, Y, Cr, Nb, Si, K, Na, Li, B, Sc, Hf, Al, Ce, Pr, Nd, Sm, Eu, Gd, Tb, Dy, Ho, Er, Tm, Yb, Lu, W. For example, the dielectric material may be (Ca, Sr)(Ti, Zr)$O_3$(CaSr/TiZr is 0.6 to 1.2).

If necessary, the dielectric material may contain about 0.001 to 30 wt % of one or more oxides of Ba, La, Mg, Mn, V, Y, Cr, Nb, Si, K, Na, Li, B, Sc, Hf, Al, Ce, Pr, Nd, Sm, Eu, Gd, Tb, Dy, Ho, Er, Tm, Yb, Lu, W, etc.

For adjustment of firing temperature, linear expansion coefficient, and the like, the dielectric material may contain $SiO_2$, a compound containing one or more elements of Ba, Ca, Sr, Ti, Zr, La, Mg, Mn, V, Y, Cr, Nb, Si, K, Na, Li, B, Sc, Hf, Al, etc., or a glass containing these, $SiO_2$, and the like.

A thickness td per one layer of the internal dielectric layer 10 (see FIG. 2) is 0.5 μm or less, preferably 0.3 to 0.5 In the present embodiment, a variation (σ) of the thicknesses (td) of the internal dielectric layers 10 is preferably 100 nm or less, more preferably 90 nm or less, particularly preferably 80 nm or less.

Exterior Region 11

The dielectric layers constituting the exterior regions 11 may be composed of any material that is identical to or different from a material of the dielectric layers constituting the above-mentioned internal dielectric layers 10.

The exterior regions 11 (see FIG. 1) have any thickness t0, but preferably has a thickness t0 of 15 to 200 μm, more preferably 15 to 80 μm. When the exterior regions 11 have a thickness t0 in such a range, the internal electrode layers 12 and the internal dielectric layers 10 are protected while cracks are prevented from occurring, and the size is downsized. The exterior regions 11 formed on both sides of the capacitor element body 4 in the Z-axis direction may have thicknesses t0 that are identical to or different from each other provided that the above conditions are satisfied.

Internal Electrode Layer 12

The internal electrode layers 12 are constituted by a conductive material of a base metal that substantially acts as an electrode. Specifically, the internal electrode layers 12 preferably has a main component of Ni or a Ni alloy. The Ni alloy is preferably an alloy of Ni and one or more elements of Mn, Cr, Co, Al, W, etc. The Ni alloy preferably contains 95 wt % or more of Ni. Ni or the Ni alloy may contain 0.1 wt % or less of various minor components of P, C, Nb, Fe, Cl, B, Li, Na, K, F, S, etc.

The internal electrode layer 12 (see FIG. 2) may have a thickness te that is appropriately determined depending on purpose of the multilayer ceramic capacitor 2 or so, and preferably has a thickness te of 0.05 to 0.30 μm, more preferably 0.3 to 0.6 μm.

The internal electrode layer 12 contains conductive particles whose average particle size is smaller than a thickness te of the internal electrode layer 12 (see FIG. 2), and contains conductive particles whose average particle size is preferably 0.05 to 0.30 μm, more preferably 0.05 to 0.15 μm.

Figure 3A:
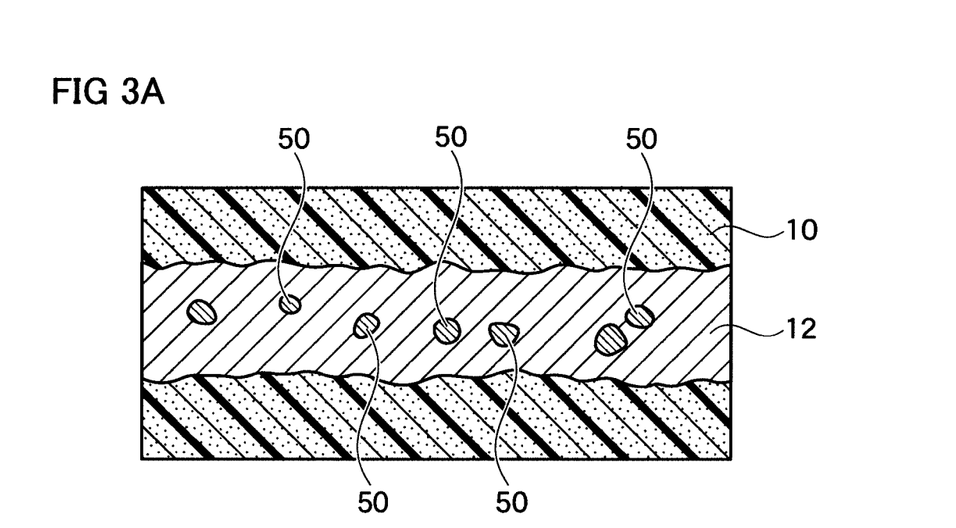
FIG. 3A is a schematic cross sectional view of a partially enlarged inner electrode layer of examples of the present invention.

As shown in FIG. 3A, the internal electrode layer 12 of the present embodiment contains ceramic particles 50. A content ratio of the ceramic particles 50 contained in the internal electrode layer 12 is preferably 2.0 to 15.0%, more preferably 3.0 to 10.0%, still more preferably 4.0 to 8.0%, by representation of cross sectional area.

The "content ratio by representation of cross sectional area" is a content ratio (average value) that is determined from a ratio of ceramic particles contained in the internal electrode layer using an image. This image is obtained by an enlarged observation with a magnification of 10,000 using a scanning electron microscope (SEM) with respect to a fractured surface obtained by fracturing the multilayer ceramic capacitor vertically to plane surfaces of the internal electrode layers as mentioned below. In other words, the "content ratio by representation of cross sectional area" is a value showing what percent a total area of the ceramic particles observed on a predetermined cross section accounts for the electrode area.

The ceramic particles 50 may be any particles as long as they function for expression of effects according to the present embodiment, but the ceramic particles 50 are desired to be constituted by the same material as a main material constituting the dielectric layers or are desired to be constituted by additive elements, taking into consideration that a certain ratio of the ceramic particles 50 is moved to the dielectric layers and incorporated thereinto during firing. The ceramic particles 50, however, are not necessarily constituted by the same material as a main material constituting the dielectric layers.

In the present embodiment, the ceramic particles 50 may contain at least any of $BaTiO_3$, $ZrO_2$, general formula $R_2O_3$ (R is at least one element selected from Y, Dy, Ho, and Er), and an oxide of alkali earth metals (at least one element selected from Mg, Ca, Ba, and Sr).

The ceramic particles 50 have any particle size as long they are completely contained in the internal electrode layer 12, but have an average particle size that is half or less of a thickness of the internal electrode layer 12, preferably 0.2 μm or less (excluding zero).

In the present embodiment, a coverage factor of the internal electrode layers 12 is preferably 70% or more, more preferably 80% or more, and still more preferably 85% or more. The internal electrode layers 12 shown in FIG. 1 and FIG. 2 are illustrated continuously in the X-axis direction and the Y-axis direction, but the internal electrode layer 12 actually has disconnected parts on its cross section. The disconnected parts of the internal electrode layer 12 on its cross section do not cause a functional problem of the internal electrode layer 12 if the internal electrode layers 12 are continuous on the other cross sections. The coverage factor of the internal electrode layers 12 is calculated as a value (%) of a total length of electrodes excluding the disconnected parts divided by lengths of electrodes continuing ideally on the cross sections of the internal electrode layers 12.

External Electrodes 6 and 8

The external electrodes 6 and 8 are composed of at least one metal of Pd, Ag, Au, Cu, Pt, Rh, Ru, Ir, etc. as a conductive material or an alloy of these, and are constituted by a single layer conductive film or a multilayer conductive film. The external electrodes 6 and 8 have any thickness, such as a thickness of about 1 to 100 μm, particularly about 5 to 50 μm. The external electrodes may contain glass for the purpose of improvement in sinterability of the conductive material and maintenance of adhesive property with the laminated body.

Manufacturing Method of Multilayer Ceramic Capacitor

Next, a manufacturing method of the multilayer ceramic capacitor 2 according to the present embodiment is described.

First, the internal dielectric layers 10 and the internal electrode layers 12 are laminated alternately by a normal printing method or sheet method using a paste, and a model of the element body (laminated body) is formed. At the same time or after this, dielectric sheets to be the exterior regions 11 are laminated.

Next, the external electrodes 6 and 8 are formed on both end surfaces of the laminated body on the sides of the external electrodes 6 and 8 by printing, transferring, adhesion, dipping, or the like. Thereafter, the multilayer ceramic capacitor 2 can be manufactured by firing. The details of each manufacturing step is described in order in (1) to (5) below.

(1) Manufacture of Chip Laminated Body (Element Body)

When a so-called printing method is used, a dielectric layer forming paste and an internal electrode layer forming paste are laminated and printed in order on a support body, such as polyethylene terephthalate. At this time, as shown in FIG. 1 and FIG. 2, each of the internal electrode layers 12 is printed so that a predetermined form with respect to an outer frame of the dielectric layer forming paste is obtained. After the internal dielectric layers 10 and the internal electrode layers 12 are laminated and printed in order, this is cut into a predetermined shape, turned into a chip, and thereafter peeled from the support body. Then, a chip laminated body (a model of the element body) is formed. Incidentally, the dielectric layers to be the exterior regions 11 can be formed by a printing method or so in a similar manner to the internal dielectric layers 10.

When a so-called sheet method is used, a plurality of green sheets is formed using a dielectric layer forming paste. An internal electrode layer forming paste is applied onto the green sheets, and sheet bodies consisting of the green sheets and the internal electrode layer forming paste are formed. The sheet bodies are laminated in order, undergo a predetermined operation of heating and pressurizing, and are thereafter cut into a predetermined shape. Then, a chip laminated body (a model of the element body) is formed. Incidentally, the dielectric layers to be the exterior regions 11 can be formed by a sheet method or so in a similar manner to the internal dielectric layers 10.

A content ratio of the ceramic particles 50 in the internal electrode layer forming paste is 0.1 to 40 wt %, preferably 1 to 20 wt %, in terms of a solid content with respect to a solid content of a base metal (e.g., nickel or nickel alloy).

An example of composition of a normally used paste in the above step is described below.

<Dielectric Layer Forming Paste>

A paste where a dielectric raw material and an organic vehicle are kneaded and dispersed is used as the dielectric layer forming paste.

A powder whose average particle size is about 0.05 to 0.2 µm is normally used for the dielectric raw material. A dielectric raw material content in the dielectric layer forming paste is normally about 30 to 80 wt %.

The organic vehicle used for the dielectric layer forming paste is an organic vehicle where a binder is dissolved in an organic solvent. The binder is a known resin binder, such as ethyl cellulose, a copolymer of polyvinyl butyral and a methacrylic acid ester, and an acrylate ester based copolymer. The organic vehicle for dissolving the binder is an organic solvent, such as terpineol, butyl carbitol, acetone, and toluene. There is no limit to a binder content or an organic solvent content in the dielectric layer forming paste, but the binder content is normally about 1 to 5 wt %, and the organic solvent content is normally about 10 to 50 wt %.

<Internal Electrode Layer Forming Paste>

The internal electrode layer forming paste is prepared by kneading and dispersing the internal electrode conductive particles composed of the above-mentioned various conductive metals or alloys, ceramic particles, and the organic vehicle. The internal electrode conductive particles contained in the paste preferably have an average particle size of 0.4 µm or less, more preferably 0.2 µm or less, still more preferably 0.05 to 0.15 µm.

The conductive paste contains co-existent material particles (ceramic particles) to be the ceramic particles 50 shown in FIG. 3A. The co-existent material particles before firing preferably has an average particle size of 0.01 to 0.1 µm. The co-existent material particles are preferably contained at 0.1 to 20 pts.wt. with respect to 100 pts.wt. of the internal electrode conductive particles.

(2) Debinding Treatment Step

The chip laminated body manufactured in the above manner preferably undergoes a debinding treatment before being fired. Conditions of the debinding treatment are appropriately determined based on used materials or so. For example, the following conditions are particularly preferable when using a base metal of Ni, Ni alloy, or the like as the conductive material of the internal electrode layers.

Conditions of Debinding Treatment

Rising temperature rate: 5 to 300° C./hour
Holding temperature: 200 to 800° C.
Temperature holding time: 0.5 to 24 hours
Atmosphere: air or reduced atmosphere (3) Firing Step A firing step of the chip laminated body according to the present embodiment is conducted at a firing temperature (maximum temperature) of 1000 to 1400° C. A holding time of the maximum temperature during firing is preferably 1 hour or less. A rising temperature rate to the firing temperature (maximum temperature) during temperature rising is 25° C./second or more, preferably 50° C./second or more, more preferably 100° C./second or more.

In the present embodiment, as shown in FIG. 3A, more ceramic particles 50 can be contained in the internal electrode layers 12 by increasing temperature to the firing temperature at a predetermined temperature rising rate. For more detail, when the temperature rising rate is in the above range, more ceramic particles 5 can be contained in the internal electrode layer 12 as shown in FIG. 3A in the present embodiment provided that the internal dielectric layer 10 has a thickness of 0.5 µm or less, compared to a comparative example shown in FIG. 3B.

Incidentally, the firing step is preferably conducted in a reduced atmosphere, but is not necessarily conducted in a reduced atmosphere. A gas of the reduced atmosphere during firing is not limited, and is formed by flowing a mixture gas of $N_2$ and 0.1 to 10 vol % of $H_2$ through a water vapor, for example. An oxygen partial pressure is not limited, but is preferably $10^{-50}$ to $10^{-5}$ Pa.

(4) Annealing Step

When the laminated body is fired in a reduced atmosphere, it is preferably annealed. The annealing is a treatment for reoxidation of the dielectric layers, and can significantly increase an accelerated lifetime of insulation resistance.

An oxygen partial pressure of the annealing atmosphere is $10^{-9}$ Pa or more, preferably $10^{-9}$ to 1 Pa. A holding temperature of the annealing is 1100° C. or less, preferably 500 to 1100° C.

Incidentally, the annealing step may consist of only a rising temperature part and a falling temperature part. In this case, the temperature holding time is unnecessary, and the holding temperature is identical to the maximum temperature. The temperature holding time during annealing is 0 to 20 hours, preferably 2 to 10 hours. The atmosphere gas is preferably composed of $N_2$ and humidified $H_2$ gas.

Incidentally, for example, a wetter may be used for humidification of $N_2$, $H_2$, a mixed gas, and the like in each step of the above-mentioned debinding treatment, firing, and annealing. In this case, a water temperature is preferably about 0 to 75° C.

Each step of the debinding treatment, firing, and annealing may be conducted continuously or independently. When the steps are conducted continuously, the firing may be conducted by changing the atmosphere without cooling after the debinding treatment and then sequentially increasing the temperature to the maximum temperature of the firing, and the annealing may be subsequently conducted by changing the atmosphere when the temperature reaches the holding temperature of the annealing step by cooling.

When the steps are conducted independently, the debinding step is conducted by increasing the temperature to a predetermined holding temperature, holding it for a predetermined time, and decreasing it to a room temperature. At this time, the debinding is conducted in a similar atmosphere to the atmosphere when the steps are conducted continuously. Moreover, the annealing step is conducted by increasing the temperature to a predetermined holding temperature, holding it for a predetermined time, and decreasing it to a room temperature. At this time, the annealing is conducted in a similar atmosphere to the atmosphere when the steps are conducted continuously. The debinding step and the firing step may be conducted continuously, and only the annealing step may be conducted independently. Instead, only the debinding step may be conducted independently, and the firing step and the annealing step may be conducted continuously.

(5) External Electrode Forming Step

An external electrode forming paste is printed or transferred on both end surfaces opposed to each other of the chip laminated body (model of the element body) manufactured in the above manner. Thereafter, the external electrodes are formed by firing. The external electrodes can be also formed by firing after the external electrode forming paste is applied by dipping.

For example, the external electrode forming paste is preferably fired in a reduced atmosphere of a mixed gas of $N_2$ and $H_2$ or so at 600 to 800° C. for about 10 minutes to 1 hour.

<External Electrode Forming Paste>

The external electrode forming paste uses a conductive material of at least one metal of Pd, Ag, Au, Cu, Pt, Rh, Ru, Ir, etc. or an alloy of these, and is prepared in a similar manner to the above internal electrode layer forming paste.

Incidentally, each of the above-mentioned pastes may contain an additive selected from various dispersant, plasticizer, dielectric, insulator, and the like as necessary. The total amount of these materials is preferably 10 wt % or less.

The multilayer ceramic capacitor 2 according to the present embodiment manufactured in the above-mentioned manner is provided with a terminal metal fitting as necessary and is used by being mounted on a print board or so by soldering or so.

Figure 3B:
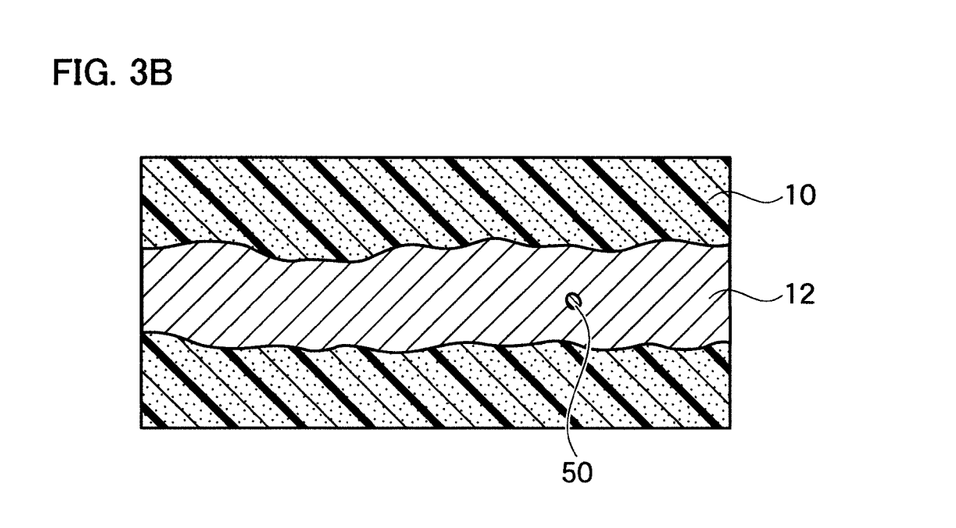
FIG. 3B is a schematic cross sectional view of a partially enlarged inner electrode layer of comparative examples of the present invention.

In the present embodiment, when the ceramic particles 50 are contained in the internal electrode layers 12 at a larger content ratio by representation of cross sectional area as shown in FIG. 3A compared to the comparative example shown in FIG. 3B, high temperature accelerated lifetime and reliability are improved provided that the dielectric layer 10 has a thickness td of 0.5 μm or less. In the present embodiment, the dielectric layers 10 can have a reduced thickness variation, and the internal electrode layers 12 has an improved coverage factor. The dielectric layers preferably have a thickness variation of 100 nm or less, more preferably 90 nm or less, still more preferably 80 nm or less. The internal electrode preferably has a coverage factor of 70% or more, more preferably 80% or more, still more preferably 85% or more.

Since a comparatively large number of the ceramic particles 50 remain in the internal electrode layers 12, the amount of ceramic particles discharged from the internal electrode layers 12 to the dielectric layers 10 is small. Thus, the ceramic particles are prevented from reacting with the dielectric material constituting the dielectric layers. This prevents a composition deviation caused by change in crystal structure of the dielectric layers 10, and original properties of the multilayer ceramic electronic device 2 can be obtained.

In the present embodiment, the internal electrode layer preferably has a thickness of 0.6 μm or less. When the dielectric layer has a thickness of 0.5 μm or less, the multilayer ceramic electronic device 2 can have a further enhanced reliability with the internal electrode layers having a thickness of 0.6 μm or less.

Incidentally, the present invention is not limited to the above-mentioned embodiment and may be variously changed within the scope of the present invention. For example, the above-mentioned embodiment describes a multilayer ceramic capacitor, but the present invention may be applied to other multilayer ceramic electronic devices having a repeat multilayer structure of internal electrode layers and dielectric layers in addition to capacitors.

EXAMPLES

Hereinafter, the present invention is described in more detail with specific examples, but is not limited to the examples.

Example 1

Preparation of Dielectric Layer Forming Paste

A ceramic powder having a main component of a $BaTiO_3$ whose average particle size was 0.1 μm was prepared as a main raw material of dielectric layers. 10 wt % of a polyvinylbutyral (PVB) resin as an organic binder and 5 wt % of a dioctyl phthalate (DOP) as a plasticizer were respectively weighed and added to the main raw material. Thereafter, the main raw material was kneaded and turned into a slurry (dielectric layer forming paste).

Preparation of Internal Electrode Forming Paste

Ni particles whose average particle size is 0.1 μm were prepared. The Ni particles were added with 10 wt % (co-existent material amount) of a ceramic powder (ceramic particles whose average particle size was 0.03 μm) composed of $BaTiO_3$. Moreover, 5 wt % of an ethyl cellulose resin and 35 wt % of a turbineol were weighed and added to the mixed powder. Thereafter, the mixed powder was kneaded in a ball mill, and an internal electrode forming paste was formed.

Manufacture of Chip Laminated Body (Model of Element Body)

Ceramic green sheets (green sheets of dielectric) to be having a thickness of 0.55 μm after drying (thickness after sintering: 0.5 μm) by a doctor blade method were manufactured using the above dielectric layer forming slurry (paste). The above internal electrode layer forming paste was applied onto the ceramic green sheets by a screen printing method, and an internal electrode layer pattern whose thickness was 0.50 μm (thickness after sintering: 0.45 μm) was formed.

Next, ceramic green sheets where no internal electrode layer pattern was printed were overlapped until a thickness of 30 μm was obtained, 300 ceramic sheets manufactured by printing the internal electrode layer pattern in the above manner were overlapped thereon, and ceramic green sheets where no electrode pattern was formed were further overlapped thereon until a thickness of 30 μm was obtained. Then, a chip laminated body whose size was 0.6 mm×0.3 mm×0.3 mm was obtained by conducting heating and pressurizing with conditions of 80° C. and 1 ton/cm².

Debinding Step and Firing Step

To remove the binder contained in the chip laminated body, the chip laminated body was left at 500° C. for 1 hour for the purpose of so-called debinding.

Thereafter, the chip laminated body was fired in a reduced atmosphere obtained by passing a $N_2$ gas through a water vapor, and a multilayer ceramic capacitor provided with the internal electrode layers containing the ceramic particles 50 in a predetermined range was obtained. The firing step was conducted at a firing temperature of 1200° C. and a temperature rising rate to the firing temperature of 25° C./second. This allows the internal electrode layers 12 to confine the ceramic particles 50 (dielectric particles: co-existent material) added in the internal electrode forming paste.

After the firing step, an annealing step for reoxidation of the dielectric layers was conducted. That is, a heat treatment was conducted in a reduced atmosphere obtained by passing a $N_2$ gas through a water vapor.

Samples of Example 1 were manufactured in such procedures.

The samples were measured in the following manner with respect to (1) Internal electrode coverage factor, (2) Thickness variation of dielectric layers, (3) Content ratio by representation of cross sectional area of ceramic particles contained in internal electrode layers, and (4) Mean time to failure (MTTF).

(1) Internal Electrode Coverage Factor

The multilayer ceramic capacitor was fractured at a vertical surface to the plane surfaces of the internal electrode layers, and the fractured surface was enlarged and observed at 3,000 magnifications with respect to 9 visual fields using a scanning electron microscope (SEM). Then, an existence ratio (average) of 40 internal electrode layers 12 per one visual field was calculated as an internal electrode coverage factor X (%). Ideally, the internal electrode layers 12 are continuous and have a predetermined length L. However, disconnected parts due to a so-called spheroidization are generated at a plurality of points of the internal electrode layers 12, and a total length/Li of the divided electrodes excluding the disconnected parts is an actual length of the internal electrode layers 12. Incidentally, if no disconnection parts are generated in the internal electrode layers 12, the internal electrode coverage factor is 100%.

(2) Thickness Variation of Dielectric Layers

The multilayer ceramic capacitor was fractured at a vertical surface to the plane surfaces of the internal electrode layers, and the fractured surface was magnified and observed at 3,000 magnifications with respect to nine visual fields using a scanning electron microscope (SEM). Then, a standard deviation ($\sigma$) was calculated by measuring thicknesses of the dielectric layers (internal dielectric layers 10) at 1000 points per one visual field, and an average value of the standard deviations at the nine visual fields was calculated as a thickness variation of the dielectric layers (internal dielectric layers 10).

(3) Content Ratio of Ceramic Particles Contained in Internal Electrode Layer by Representation of Cross Sectional Area The multilayer ceramic capacitor 2 was fractured at three vertical surfaces to the plane surfaces of internal electrode layers, and each of the fractured surfaces was magnified and observed at 15,000 magnifications with respect to nine visual fields using a scanning electron microscope (SEM). Then, a ratio of the ceramic particles 50 contained in the internal electrode layers is calculated as an area ratio from the image and determined as a content ratio (average value).

(4) Mean Time to Failure (MTTF)

Each sample was held at 160° C. in a DC electric field of 5 V/μm and measured with respect to a high temperature accelerated lifetime as a reliability evaluation. In the present examples, 20 samples underwent a Weibull analysis for calculation of MTTF provided that a time from the beginning of voltage application to the drop of insulation resistance by one order was determined as a failure time. A MTTF of 5 hours or more was considered to be favorable, a MTTF of 15 hours or more was considered to be more favorable, and a MTTF of 20 hours or more was considered to be extremely favorable.

Table 1 shows the results. Incidentally, the thickness of the dielectric layer and the thickness of the internal electrode layer in Table 1 (the same applies to the other Tables) are an average value of measured values from the above-mentioned SEM cross sectional picture.

Example 2

Samples of Example 2 were manufactured in a similar manner to Example 1 except that the temperature rising rate in the firing step was changed from 25° C./second to 50° C./second, and were measured in a similar manner to Example 1. Table 1 shows the results.

Example 3

Samples of Example 3 were manufactured in a similar manner to Example 1 except that the temperature rising rate in the firing step was changed from 25° C./second to 100° C./second, and were measured in a similar manner to Example 1. Table 1 shows the results.

Comparative Example 1

Samples of Comparative Example 1 were manufactured in a similar manner to Example 1 except that the temperature rising rate in the firing step was changed from 25° C./second to 10° C./second, and were measured in a similar manner to Example 1. Table 1 shows the results.

Example 4

Samples of Example 4 were manufactured in a similar manner to Example 1 except that the thickness of the internal electrode layer pattern was changed from 0.50 μm to 0.45 μm (thickness after sintering: 0.40 μm), and were measured in a similar manner as Example 1. Table 1 shows the results.

Example 5

Samples of Example 5 were manufactured in a similar manner to Example 4 except that the temperature rising rate in the firing step was changed from 25° C./second to 50° C./second, and were measured in a similar manner to Example 1. Table 1 shows the results.

Example 6

Samples of Example 6 were manufactured in a similar manner to Example 4 except that the temperature rising rate in the firing step was changed from 25° C./second to 100° C./second, and were measured in a similar manner to Example 1. Table 1 shows the results.

Comparative Example 2

Samples of Comparative Example 2 were manufactured in a similar manner to Example 4 except that the temperature rising rate in the firing step was changed from 25° C./second to 10° C./second, and were measured in a similar manner to Example 1. Table 1 shows the results.

Example 10

Samples of Example 10 were manufactured in a similar manner to Example 3 except that the thickness of the internal electrode layer pattern was changed from 0.45 μm to 1.10 μm (thickness after sintering: 1.00 μm), and were measured in a similar manner to Example 1. Table 2 shows the results.

Example 11

Samples of Example 11 were manufactured in a similar manner to Example 10 except that the thickness of the internal electrode layer was changed to 0.80 μm after sintering, and were measured in a similar manner to Example 1. Table 2 shows the results.

Example 12

Samples of Example 12 were manufactured in a similar manner to Example 10 except that the thickness of the internal electrode layer was changed to 0.60 μm after sintering, and were measured in a similar manner to Example 1. Table 2 shows the results.

Comparative Example 10

Samples of Comparative Example 10 were manufactured in a similar manner to Example 10 except that the temperature rising rate in the firing step was changed from 100° C./second to 10° C./second, and were measured in a similar manner to Example 1. Table 2 shows the results.

Example 13

Samples of Example 13 were manufactured in a similar manner to Example 4 except that the thickness of the dielectric layer was changed to 0.4 μm after firing, and were measured in a similar manner to Example 1. Table 2 shows the results.

Example 14

Samples of Example 14 were manufactured in a similar manner to Example 5 except that the thickness of the dielectric layer was changed to 0.4 μm after firing, and were measured in a similar manner to Example 1. Table 2 shows the results.

Example 15

Samples of Example 15 were manufactured in a similar manner to Example 6 except that the thickness of the dielectric layer was changed to 0.4 μm after firing, and were measured in a similar manner to Example 1. Table 2 shows the results.

Comparative Example 11

Samples of Comparative Example 11 were manufactured in a similar manner to Comparative Example 2 except that the thickness of the dielectric layer was changed to 0.4 μm after firing, and were measured in a similar manner to Example 1. Table 2 shows the results.

Comparative Example 20

Samples of Comparative Example 20 were manufactured in a similar manner to Comparative Example 1 except that the thickness of the dielectric layer was changed from 0.5 μm to 1.0 μm after firing, and were measured in a similar manner to Example 1. Table 3 shows the results.

Comparative Example 21

Samples of Comparative Example 21 were manufactured in a similar manner to Comparative Example 20 except that the temperature rising rate in the firing step was changed from 10° C./second to 25° C./second, and were measured in a similar manner to Example 1. Table 3 shows the results.

Comparative Example 22

Samples of Comparative Example 22 were manufactured in a similar manner to Comparative Example 20 except that the temperature rising rate in the firing step was changed from 10° C./second to 50° C./second, and were measured in a similar manner to Example 1. Table 3 shows the results.

Comparative Example 23

Samples of Comparative Example 23 were manufactured in a similar manner to Comparative Example 20 except that the temperature rising rate in the firing step was changed from 10° C./second to 100° C./second, and were measured in a similar manner to Example 1. Table 3 shows the results.

Example 20

Samples of Example 20 were manufactured in a similar manner to Example 10 except that the amount of the co-existent material was changed from 10 wt % to 15 wt %, and were measured in a similar manner to Example 1. Table 4 shows the results.

Example 21

Samples of Example 21 were manufactured in a similar manner to Example 10 except that the amount of the co-existent material was changed from 10 wt % to 20 wt %, and were measured in a similar manner to Example 1. Table 4 shows the results.

Comparative Example 31

Samples of Example 31 were manufactured in a similar manner to Example 10 except that the amount of the co-existent material was changed from 10 wt % to 25 wt %, and were measured in a similar manner to Example 1. Table 4 shows the results.

Evaluation

In Table 1, Comparative Example 1 and Example 1 to Example 3 were compared, and Comparative Example 2 and Example 4 to Example 6 were compared. Then, it was confirmed that when the dielectric layers (internal dielectric layers 10) had a thickness of 0.5 μm or less, the mean time to failure was 15 hours or more, preferably 20 hours or more, and reliability was improved provided that the content ratio of ceramic particles was 2% or more, preferably 3% or more, by representation of cross sectional area. According to Examples 1 to 6, it was confirmed that the thickness variation of the dielectric layers was preferably 100 nm or less, more preferably 90 nm or less, still more preferably 80 nm or less, and that the internal electrode coverage factor was preferably 70% or more, more preferably 80% or more, still more preferably 85% or more.

As shown in Table 1 and Table 2, it was confirmed that when the dielectric layer (internal electrode layer 10) had a thickness of 0.5 μm or less, reliability was improved provided that the internal electrode layer had a thickness of 0.6 μm or less, preferably 0.45 μm or less.

Moreover, as shown in Table 2, it was confirmed that when the dielectric layer had a thickness of 0.4 μm or less, reliability was improved provided that the content ratio of the ceramic particles was 2% or more by representation of cross sectional area, and reliability was further improved provided that the content ratio of the ceramic particles was 3% or more by representation of cross sectional area.

As shown in Table 3, when comparing the mean time to failure with the internal electrode layers 10 whose thicknesses were 1.0 μm, it was confirmed that there was no large difference among Comparative Example 20 (standard) to Comparative Example 23 with the internal electrode layers 10 whose thicknesses were 1.0 μm. On the other hand, as shown in Comparative Example 1 (standard) and Example 1 to Example 3, it was confirmed that when the thicknesses of the internal electrode layers 10 were 0.5 μm, an improvement ratio of the mean time to failure of Example 1 to Example 3 with respect to Comparative Example 1 (standard) was at least about four times or more. That is, it was confirmed that when the thicknesses of the internal electrode layers 10 were 0.5 μm, no effects were demonstrated provided that the content ratio of the ceramic particles was less than 2% by representation of cross sectional area, and the mean time to failure was 15 hours or more, preferably 20 hours or more, more preferably 24 hours or more and reliability was improved provided that the content ratio of the ceramic particles was 2% or more, preferably 3% or more, more preferably 4% or more, by representation of cross sectional area.

As shown in Table 1 to Table 4, it was confirmed that when the dielectric layers had a thickness of 0.5 μm or less, the mean time to failure was large and reliability was improved provided that the content ratio of the ceramic particles had an upper limit of 15.0% or less, preferably 12.0% or less, more preferably 10.0% or less, still more preferably 6.0% or less, by representation of cross sectional area.

It was also confirmed that the thickness variation of the dielectric layers was preferably 100 nm or less, more preferably 90 nm or less, still more preferably 80 nm or less, and that the internal electrode coverage factor was preferably 70% or more, more preferably 80% or more, still more preferably 85% or more.

TABLE 1

| No. | Temperature rising rate [° C./sec] | Thickness of dielectric layer td [μm] | Thickness of internal electrode layer te [μm] | Internal electrode coverage factor [%] | Thickness variation of dielectric layers σ [nm] | Ratio of ceramic particles [%] | Mean time to failure [h] |
|---|---|---|---|---|---|---|---|
| Example 1 | 25 | 0.5 | 0.45 | 82 | 87 | 2.5 | 16 |
| Example 2 | 50 | 0.5 | 0.45 | 85 | 79 | 3.1 | 20 |
| Example 3 | 100 | 0.5 | 0.45 | 95 | 56 | 4.2 | 24 |
| Comp. Ex. 1 | 10 | 0.5 | 0.45 | 75 | 182 | 1.6 | 4 |
| Example 4 | 25 | 0.5 | 0.4 | 77 | 96 | 2.0 | 15 |
| Example 5 | 50 | 0.5 | 0.4 | 81 | 83 | 2.9 | 18 |
| Example 6 | 100 | 0.5 | 0.4 | 90 | 61 | 3.9 | 22 |
| Comp. Ex. 2 | 10 | 0.5 | 0.4 | 69 | 214 | 1.4 | 3 |

TABLE 2

| No. | Temperature rising rate [° C./sec] | Thickness of dielectric layer td [μm] | Thickness of internal electrode layer te [μm] | Internal electrode coverage factor [%] | Thickness variation of dielectric layers σ [nm] | Ratio of ceramic particles [%] | Mean time to failure [h] |
|---|---|---|---|---|---|---|---|
| Example 10 | 100 | 0.5 | 1.0 | 95 | 73 | 5.5 | 8 |
| Example 11 | 100 | 0.5 | 0.8 | 95 | 81 | 5.1 | 9 |
| Example 12 | 100 | 0.5 | 0.6 | 95 | 78 | 4.7 | 15 |
| Comp. Ex. 10 | 10 | 0.5 | 1.0 | 85 | 155 | 1.8 | 4 |
| Example 13 | 25 | 0.4 | 0.4 | 73 | 98 | 2.0 | 6 |
| Example 14 | 50 | 0.4 | 0.4 | 78 | 91 | 2.7 | 6 |
| Example 15 | 100 | 0.4 | 0.4 | 88 | 75 | 3.6 | 8 |
| Comp. Ex. 11 | 10 | 0.4 | 0.4 | 65 | 220 | 1.2 | 2 |

TABLE 3

| No. | Temperature rising rate [° C./sec] | Thickness of dielectric layer td [μm] | Thickness of internal electrode layer te [μm] | Internal electrode coverage factor [%] | Thickness variation of dielectric layers σ [nm] | Ratio of ceramic particles [%] | Mean time to failure [h] | Ratio of standard |
|---|---|---|---|---|---|---|---|---|
| Comp. Ex. 20 (standard) | 10 | 1.0 | 0.45 | 78 | 185 | 1.7 | 173 | — |
| Comp. Ex. 21 | 25 | 1.0 | 0.45 | 83 | 88 | 2.4 | 183 | 1.06 |
| Comp. Ex. 22 | 50 | 1.0 | 0.45 | 86 | 77 | 3.3 | 168 | 0.97 |
| Comp. Ex. 23 | 100 | 1.0 | 0.45 | 96 | 55 | 4.5 | 177 | 1.02 |
| Comp. Ex. 1 (standard) | 10 | 0.5 | 0.45 | 75 | 182 | 1.6 | 4 | — |
| Example 1 | 25 | 0.5 | 0.45 | 82 | 87 | 2.5 | 16 | 4.00 |
| Example 2 | 50 | 0.5 | 0.45 | 85 | 79 | 3.1 | 20 | 5.00 |
| Example 3 | 100 | 0.5 | 0.45 | 95 | 56 | 4.2 | 24 | 6.00 |

TABLE 4

| No. | Temperature rising rate [° C./sec] | Thickness of dielectric layer td [μm] | Thickness of internal electrode layer te [μm] | Amount of co-existent material [wt %] | Internal electrode coverage factor [%] | Thickness variation of dielectric layers σ [nm] | Ratio of ceramic particles [%] | Mean time to failure [h] |
|---|---|---|---|---|---|---|---|---|
| Example 10 | 100 | 0.5 | 1.0 | 10 | 95 | 73 | 5.5 | 8 |
| Example 20 | 100 | 0.5 | 1.0 | 15 | 93 | 86 | 11.3 | 6 |
| Example 21 | 100 | 0.5 | 1.0 | 20 | 87 | 97 | 15.0 | 5 |
| Comp. Ex. 31 | 100 | 0.5 | 1.0 | 25 | 69 | 146 | 18.0 | 2 |

NUMERICAL REFERENCES

2 . . . multilayer ceramic capacitor
4 . . . capacitor element body
6 . . . first external electrode
8 . . . second external electrode
10 . . . internal dielectric layer
11 . . . exterior region
12 . . . internal electrode layer
12A, 12B . . . leading portion
13 . . . interior region
14 . . . capacity region
15A, 15B . . . leading region
16 . . . side surface protection region
50 . . . ceramic particle

The invention claimed is:

1. A multilayer ceramic electronic device comprising a laminated body having alternately laminated internal electrode layers and dielectric layers, wherein
   each of the dielectric layers has a thickness of 0.5 μm or less,
   each of the internal electrode layers contains ceramic particles,
   a content ratio of the ceramic particles contained in the each of the internal electrode layers is 3 to 10% by representation of cross sectional area, and
   the each of the dielectric layers has a thickness standard deviation (σ) of 100 nm or less.

2. The multilayer ceramic electronic device according to claim 1, wherein the each of the internal electrode layers has a thickness of 0.6 μm or less.

3. The multilayer ceramic electronic device according to claim 1, wherein the each of the internal electrode layers contains a main component of Ni.

4. The multilayer ceramic electronic device according to claim 1, wherein
   the ceramic particles contain at least one of $BaTiO_3$, $ZrO_2$, $R_2O_3$ (R is at least one of Y, Dy, Ho, and Er), and an oxide of an alkali earth metal (at least one of Mg, Ca, Ba, and Sr).

5. The multilayer ceramic electronic device according to claim 1, wherein the each of the internal electrode layers has a coverage factor of 70% or more.

6. The multilayer ceramic electronic device according to claim 1, wherein the content ratio of the ceramic particles contained in the each of the internal electrode layers is 3.1 to 5.5% by representation of cross sectional area.

7. A multilayer ceramic electronic device comprising a laminated body having alternately laminated internal electrode layers and dielectric layers, wherein
   each of the dielectric layers has a thickness of 0.5 μm or less,
   each of the internal electrode layers contains ceramic particles,
   a content ratio of the ceramic particles contained in the each of the internal electrode layers is 2 to 15% by representation of cross sectional area, and
   the each of the dielectric layers has a thickness standard deviation (σ) of 100 nm or less.

\* \* \* \* \*